UNITED STATES PATENT OFFICE.

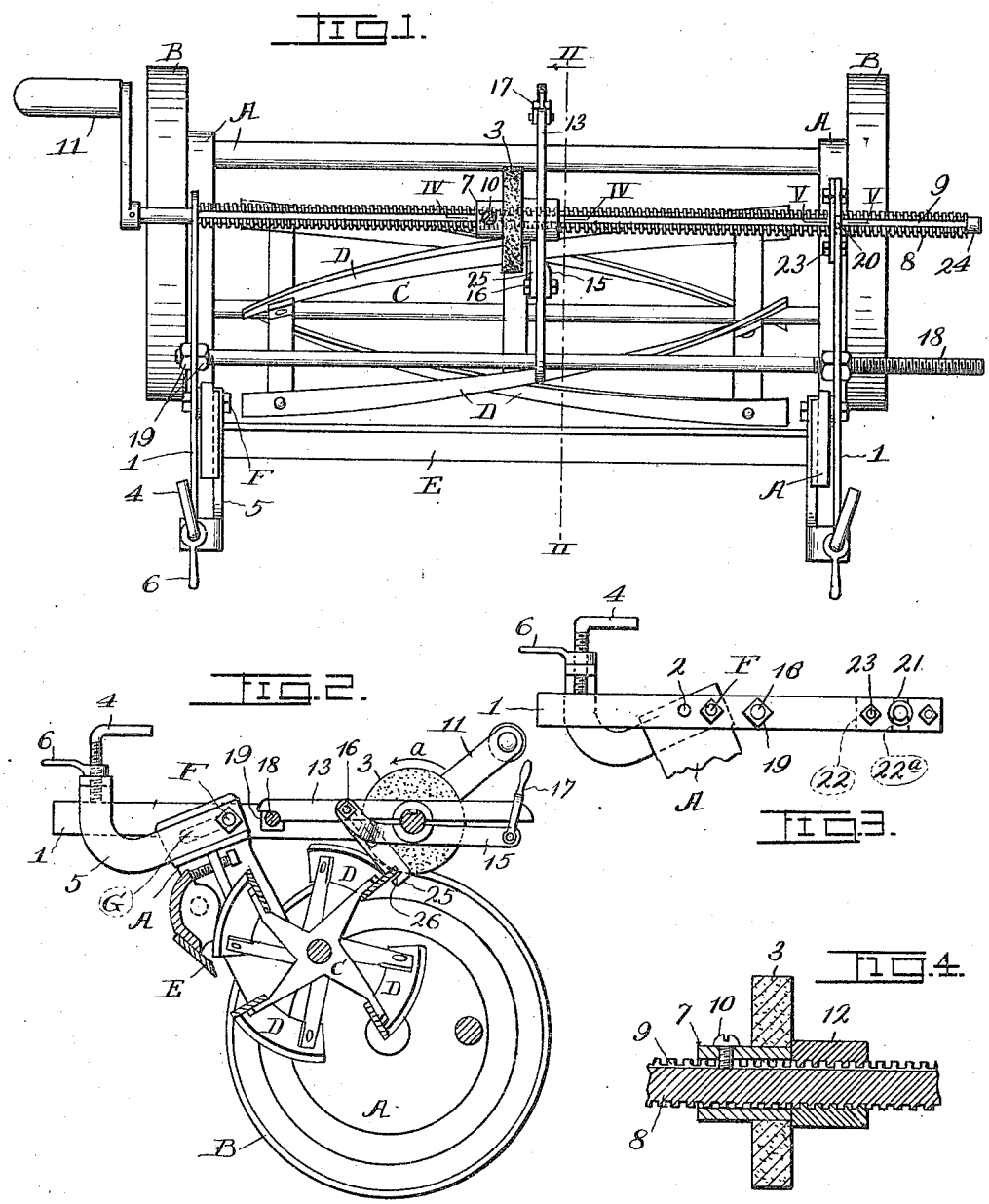

JOHN W. BOLING, OF KANSAS CITY, MISSOURI.

GRINDING-MACHINE.

1,187,807. Specification of Letters Patent. Patented June 20, 1916.

Application filed September 1, 1915. Serial No. 48,505.

*To all whom it may concern:*

Be it known that I, JOHN W. BOLING, a citizen of the United States, residing at Kansas City, in the county of Jackson and State of Missouri, have invented certain new and useful Improvements in Grinding-Machines, of which the following is a specification.

My invention relates to grinding devices and my object is to provide a simple and inexpensive device of this character whereby cutlery and the spiral knives of lawn mowers can be quickly and accurately sharpened.

The device is adjustable to lawn mowers of different sizes, and in order that it may be readily understood, reference will now be made to the accompanying drawing, in which:

Figure 1 is a plan view of the device applied to a lawn mower. Fig. 2 is a cross section on line II—II of Fig. 1. Fig. 3 is a side elevation of one of the arms of the device and means for adjusting the same. Fig. 4 is an enlarged section of the grinding wheel and adjacent parts taken on line IV—IV of Fig. 1. Fig. 5 is a section, enlarged, on line V—V of Fig. 1.

Referring now in detail to the different parts, A designates the frame of the lawn mower, B the wheels thereof, C the reel with the spiral knives D, and E the ledger plate.

While I have shown the handle and the wooden roller of the lawn mower removed, it is only necessary to remove the wooden roller and its bearings from the rear portion of the frame A in order to apply my device to the lawn mower, which is propped up on blocks or other suitable supports, so that the wheels B and the reel C can freely revolve while the spiral blades D are being sharpened.

In carrying out the invention, I employ a pair of arms 1, which are fastened to the rear ends of the frame A by bolts F, which may be the same bolts that secure the bearings of the wooden roller to the slotted rear ends of the frame A. The slots G in said rear ends allow the bolts F to be slid back and forth to obtain proper backward and forward adjustment of the arms 1, which are also provided with bolt holes 2 to admit of further backward and forward adjustment.

The arms 1 are pivoted on the bolts F, so that the emery or other grinding wheel 3 can be swung down into contact with the beveled edges of the blades D to sharpen the same. After the emery wheel 3 has been brought into such contact further downward movement of the forward ends of the arms 1 is checked by set screws 4, threaded into a pair of brackets 5, also secured to the sides of the frame A by the bolts F. After the set screws 4, which bear against the upper rear portions of the arms 1, have been properly adjusted they are locked from accidental movement by the lock nuts 6, and the arms 1 are secured from pivotal movement on the bolts F, by tightening the nuts thereof.

The emery wheel 3 is fixedly-mounted upon a hub 7, slidable upon a screw 8 journaled in the forward ends of the arms 1. Said screw 8 has a longitudinal slot 9 therein to receive a set screw 10 extending through the hub 7, to cause the same and the emery wheel 3 to rotate with said screw 8, which is provided at one end with a crank handle 11 whereby it is rotated.

When the screw is rotated in the direction of the arrow *a*, Fig. 2, it rotates the emery wheel 3 therewith and also shifts said emery wheel from one end of the screw to the other, through the intermediacy of a nut 12 threaded upon the screw 8 and bearing against one side of the emery wheel 3 and its hub 7, as disclosed by Fig. 4. The nut 12 is in two parts, so that when the emery wheel has sharpened a blade said nut can be disengaged from the screw 8, and, together with the emery wheel 3, be quickly shifted to the opposite end of said screw 8.

The upper part of the nut 12 is fixed to a bar 13 and its lower part is fixed to a bar 15 pivotally-secured to said bar 13 by a bolt 16. The bar 15 is provided at its upper end with a forked latch 17 to engage the adjacent end of the bar 13 for the purpose of holding the two members of the nut 12 in engagement with the screw 8. By swinging said latch 17 downward out of engagement with the bar 13, the bars 13 and 15 may be spread apart until the two members of the nut 12 clear the screw 8.

During the grinding operation the bar 13 is prevented from rotating with the emery wheel 3 by bearing at its rear end upon a threaded rod 18, which together with the screw 8, and the bolts F, spaces the arms 1 the proper distance apart. The rod 18 is firmly clamped to the arms 1 by nuts 19, engaging the opposite sides of each arm.

The screw 8 and the rod 18, are preferably, of sufficient length to accommodate lawn mowers of different widths, and in order that one of the arms 1 may be connected to the screw 8 without being moved laterally thereby, I form a peripheral groove 20 near one end of said screw to receive the notched portion 21 of said arm, which is held in position on the grooved portion by a plate 22 removably secured thereto by bolts 23 and having a notch 24, so that it, like the arm 1, can be removed from the groove 20, after the removal of the bolts 23. The screw 8 is also provided at its end adjacent the groove 20, with a reduced peripheral smooth portion 24, to receive the notched portions of the arm 1 and the plate 22 when the device is to be applied to a lawn mower of sufficient width to require such adjustment.

25 designates a guide pivoted at one end upon the bolt 16 and provided with a notch 26 at its opposite end to engage the beveled edge of each spiral blade D and guide the same against the periphery of the emery wheel 3 during the grinding operation, while said emery wheel is being moved longitudinally of said blade D by the screw 8 and the nut 12, as above described.

After a spiral blade D has been sharpened the reel C is rotated to bring the following blade D into engagement with the notched portion of said guide 25 and the emery wheel 3, after they have been slid to the opposite end of the screw 8. The foregoing operation is repeated until all of the knives D have been sharpened.

From the foregoing description, it is apparent that I have produced a simple grinding device which may be quickly applied to a lawn mower for the purpose of sharpening the spiral knives thereof. It is also apparent that the device may be used to advantage for grinding cutlery and other devices requiring a sharp edge, and while I have shown and described the preferred form of my invention, I reserve the right to make such changes in the construction, combination and arrangement of parts as properly fall within the spirit and scope of the claims.

Having thus described my invention, what I claim and desire to secure by Letters Patent, is:

1. In a device of the character described, a journaled screw having a longitudinal slot therein, a crank handle mounted on said screw to rotate the same, a grinding wheel slidable on said screw, means interposed between the slotted portion of the screw and said grinding wheel to cause the latter to rotate with said screw, and a nonrotatable nut mounted on the screw and bearing against one side of the grinding wheel to shift the same longitudinally of the screw when the latter is rotated.

2. In a device of the character described, a journaled screw having a longitudinal slot therein, a crank handle mounted upon said screw to rotate the same, a grinding wheel slidable on said screw, means interposed between the slotted portion of the screw and the grinding wheel to cause the latter to rotate with the screw, a nonrotatable nut consisting of two members removably engaging the screw to shift the grinding wheel longitudinally of said screw, pivoted means carrying the two members of the nut, and means removably connecting the free ends of said pivoted means so that the same may be spread apart to disengage the nut members from the screw.

3. In a device of the character described, a pair of arms adapted to be mounted upon a lawn mower, a screw journaled in said arms and provided with a longitudinal slot, means for rotating said screw, a grinding wheel slidable on said screw, means interposed between the slotted portions of the screw and the grinding wheel, whereby the latter is rotated with said screw, means for adjusting the arms to bring the grinding wheel into proper relation with the lawn mower reel, and a guide for holding the spiral knives of the reel against the grinding wheel as the same moves longitudinally of the screw.

4. In a device of the character described, a pair of arms adapted to be mounted upon a lawn mower, a screw journaled in said arms and provided with a longitudinal slot, means for rotating said screw, a grinding wheel slidable on said screw, means interposed between the slotted portion of the screw and the grinding wheel, whereby the latter is rotated with said screw, brackets secured to the lawn mower, means carried by said brackets for adjusting the arms to bring the grinding wheel into proper relation with the lawn mower reel, and a notched guide for engaging the edge of each reel knife to hold the same against the grinding wheel as the latter moves longitudinally of the screw.

In testimony whereof I affix my signature, in the presence of two witnesses.

JOHN W. BOLING.

Witnesses:
F. G. FISCHER,
L. J. FISCHER.